United States Patent
Hong et al.

(10) Patent No.: US 8,031,870 B2
(45) Date of Patent: Oct. 4, 2011

(54) CONDITIONAL ACCESS SYSTEM FOR EACH TRANSMITTER IN SINGLE FREQUENCY NETWORK, AND A METHOD THEREOF

(75) Inventors: Chung-Pyo Hong, Seoul (KR); Won-Jin Park, Seongnam (KR)

(73) Assignee: KT Corporation, Seongnam (KR)

( * ) Notice: Subject to any disclaimer, the term of this patent is extended or adjusted under 35 U.S.C. 154(b) by 1037 days.

(21) Appl. No.: 11/909,566

(22) PCT Filed: Nov. 4, 2005

(86) PCT No.: PCT/KR2005/003715
§ 371 (c)(1),
(2), (4) Date: Sep. 24, 2007

(87) PCT Pub. No.: WO2006/101299
PCT Pub. Date: Sep. 28, 2006

(65) Prior Publication Data
US 2010/0195828 A1      Aug. 5, 2010

(30) Foreign Application Priority Data
Mar. 24, 2005   (KR) .................. 10-2005-0024515

(51) Int. Cl.
H04N 7/167   (2011.01)
(52) U.S. Cl. ........... 380/239; 380/202; 725/32; 725/119
(58) Field of Classification Search .......... 380/202–204, 380/229, 239–242; 725/32, 34–36, 119, 725/126–127
See application file for complete search history.

(56) References Cited

U.S. PATENT DOCUMENTS

| | | | |
|---|---|---|---|
| 5,246,652 A * | 9/1993 | Hsu et al. ..................... | 264/109 |
| 6,055,274 A | 4/2000 | McVeigh | |
| 6,157,719 A | 12/2000 | Wasilewski et al. | |
| 6,204,774 B1 * | 3/2001 | Miwa et al. .................... | 340/5.2 |
| 6,741,834 B1 | 5/2004 | Godwin | |
| 6,999,513 B2 | 2/2006 | Sohn et al. | |

(Continued)

FOREIGN PATENT DOCUMENTS

| | | | |
|---|---|---|---|
| KR | 2003-36540 A | 5/2003 | |
| KR | 2004-54444 A | 6/2004 | |
| KR | 2004-84429 A | 10/2004 | |
| KR | 2005-16722 A | 2/2005 | |
| WO | WO99/01957 A1 | 1/1999 | |

OTHER PUBLICATIONS

International Search Report, PCT/KR2005/003715, mailed Feb. 15, 2006.

(Continued)

*Primary Examiner* — Gilberto Barron, Jr.
*Assistant Examiner* — Malcolm Cribbs
(74) *Attorney, Agent, or Firm* — Alston & Bird LLP

(57) ABSTRACT

The conditional access system in a single frequency network in a digital broadcasting system includes a main broadcasting system transmitting encoded broadcasting signals including a data stream and transmitter identification information (TII) through a main broadcasting network; a repeating system amplifying and transmitting encoded broadcasting signals of the main broadcasting network, or modulating and amplifying a stream input by the main broadcasting system through a cable, and repeating broadcasting signals of the main broadcasting system through a repeating network; a subscriber station decoding the encoded signals of the main broadcasting network included in the broadcasting signals received through the main broadcasting network or the repeating network, TII, and an encoding key according to a decoding method; and a decoding key provider receiving a decoding key from the main broadcasting or repeating system, authenticating a user, and transmitting the decoding key to a charged subscriber station through a mobile communication network.

33 Claims, 8 Drawing Sheets

U.S. PATENT DOCUMENTS

| | | | |
|---|---|---|---|
| 7,136,415 | B2 | 11/2006 | Yun et al. |
| 7,661,119 | B1 | 2/2010 | Arsenault et al. |
| 2002/0094040 | A1* | 7/2002 | Oyagi .......................... 375/340 |
| 2002/0129249 | A1* | 9/2002 | Maillard et al. .............. 713/172 |
| 2003/0072257 | A1* | 4/2003 | Ikedo et al. ................... 370/208 |
| 2003/0095664 | A1* | 5/2003 | Asano et al. .................. 380/277 |
| 2003/0137963 | A1 | 7/2003 | Suenaga et al. |
| 2004/0072575 | A1* | 4/2004 | Young et al. ............... 455/456.1 |
| 2005/0011163 | A1 | 1/2005 | Ehrensvard et al. |
| 2005/0123141 | A1* | 6/2005 | Suzuki .......................... 380/277 |
| 2007/0224934 | A1* | 9/2007 | Seo et al. ........................ 455/23 |
| 2008/0040609 | A1* | 2/2008 | Giobbi .......................... 713/182 |

OTHER PUBLICATIONS

Corrected Version of International Preliminary Report of Patentability for PCT/KR2005/003715, dated Jul. 12, 2007.

Office Action for U.S. Appl. No. 11/909,543 dated Sep. 17, 2010.

Office Action for U.S. Appl. No. 11/909,543 dated Mar. 15, 2011.

* cited by examiner

| TII-a1 | KEY$_{TII-a1}$ |
|---|---|
| ⋮ | ⋮ |
| TII-b1 | KEY$_{TII-b1}$ |
| ⋮ | ⋮ |
| TII-t1 | KEY$_{TII-t1}$ |
| ⋮ | ⋮ |

Key Table

- Main Broadcasting Station Key Table Area
- Repeater Station Key Table Area
- Communication Key Table Area

Figure 4

| Location | Subscriber Type | Received Key Value | Service Availability |
|---|---|---|---|
| A1 | Charged | Main Broadcasting Station TII | O |
| A2 | Charged | Main Broadcasting Station TII, Repeater Station TII | O |
| A3 | Charged | Repeater Station TII, Mobile Communication Descrambling Key | O |
| B1 | Uncharged | Main Broadcasting Station TII | O |
| B2 | Uncharged | Main Broadcasting Station TII, Repeater Station TII | O |
| B3 | Uncharged | Repeater Station TII | X |

Figure 5

CONDITIONAL ACCESS SYSTEM FOR EACH TRANSMITTER IN SINGLE FREQUENCY NETWORK, AND A METHOD THEREOF

TECHNICAL FIELD

The present invention relates to a conditional access system for a transmitter in a single frequency network, and a method thereof. In particular, the present invention relates to a conditional access system for each transmitter and a method thereof when other transmitters are provided in a single frequency network in a digital broadcasting system.

BACKGROUND ART

Digital broadcasting has characteristics of providing multiple channels, high quality, and multiple functions. In particular, developments of multiplexing techniques have enabled concurrent combination of images, speech, and data irrespective of contents and sizes and transmission of them, and have formed a return channel through a modem to allow interactive services. Accordingly, digital data broadcasting has overcome the problems of conventional analog broadcasting and has provided multimedia services with high added value to viewers.

However, when security between a transmitter and a receiver is not guaranteed in digital data combined broadcasting, the commercial structure of the broadcasting cannot be maintained. Broadcasting service providers have attempted to bring out services that depend on advertisement for income by activation of multiple channels and professional channels, to provide quality broadcasting services to subscribers, and to provide charged broadcasting services such as Pay-TV or Pay-Per-View (PPV) to bill TV subscription fees, and they also desire to have their various multimedia data protected and have control of the subscribers who are authorized to have a right to view the data. To solve the problems, the CAS (Conditional Access System) has been developed.

The CAS is a system for allowing subscribers having a right to view TV programs to receive specific programs by introducing the concept of subscriptions to the broadcasting, and it deals with a process for each digital broadcasting receiver to determine which broadcasting program a viewer will receive. In the CAS, a transmitter transmits encoded program signals and an entitlement given to an individual receiving user or a specific group to a receiver, and the receiver controls the ability of the subscriber having entitlement to decrypt the signal by using a smart card attached to the receiver.

Also, the conventional terrestrial and satellite digital broadcasting set the conditional access to the contents or users to thereby provide a charged service. In this instance, a process for encoding a stream to which the conditional access is applied and a process for canceling the conditional access through an encoding key received by a charged subscriber through a mobile communication network or another encoding key assigned through a smart card can be performed.

In general terrestrial and satellite digital broadcasting, a transmitter for forming a main broadcast network is provided on the single frequency network (SFN), a shade area in which no service is received is generated within the main broadcast network, and a gap filler for servicing the shade area is provided to thereby solve the problem of the shade area in the main broadcast network. For example, in a satellite digital multimedia broadcasting (DMB) system, most regions are available for receiving signals from a satellite, and the gap filler is used to acquire a receiving region in the shade regions in which no direct signal receiving is allowed, such as regions in a subway, a tunnel, and a building.

In detail, when it is not easy to directly receive satellite signals on the ground side, that is, within the tunnel, underground, and building, the gap filler receives the satellite signals through a satellite signal receive antenna and starts broadcasting.

Main broadcasting stations represent broadcasting stations that function as a main center of the broadcasting network system, and they plan, produce, and transmit broadcasting programs. In Korea, radio broadcasting stations include KBS, MBC, CBS, BBS, PBS, SBS, and Keukdong Broadcasting, and television broadcasting stations include KBS, MBC, and SBS. The broadcasting stations located in Seoul are established to be their transmitters. Commercial broadcasting in the USA or Japan forms broadcasting networks through contracts, but Korean broadcasting systems have a single organization such as KBS or have the same capital system such as MBC and CBS, and hence the transmitters perform a strong role in the system and management in addition to broadcasting substantially as headquarters.

Further, a repeater station is an auxiliary station with less power consumption, and is also called a satellite station. Conventionally, a broadcasting station has a service region, that is, a designated broadcasting region, but since boundary regions have a weak radio wave arrival and blanket areas, the satellite station is installed for the boundary regions. It is installed at mountaintops for receiving radio waves from the transmitters, and it receives the waves through high-sensitivity receivers, electrically amplifies them, and broadcasts them as radio waves of different frequencies.

However, when a main broadcasting network service provider is different from a repeater service provider, the repeater service provider generates the cost of installing and maintaining a broadcasting network in the shade region, and the repeater service provider charges for the usage of the repeating network. That is, the repeater service must be a charged service for the purpose of activating the repeating network, but no appropriate treatment for the charged service has been provided up to now.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a conditional access system for a transmitter in a single frequency network having advantages of activating a repeating network by charging the repeater business and extending the broadcasting network by a main broadcasting network service provider by providing a charged repeater service by the repeater service provider in a terrestrial and satellite digital broadcasting system.

The present invention has been made in another effort to provide a conditional access system for a transmitter in a single frequency network having advantages of controlling charged subscribers and uncharged subscribers to receive a desired service within the coverage of the main broadcasting network, controlling uncharged subscribers to receive a desired service in the overlapped area of the main broadcasting network and the repeating network, and controlling charged subscribers to receive a desired service within the repeating network.

Technical Solution

In one aspect of the present invention, a conditional access system for a transmitter in a single frequency network for terrestrial and satellite digital broadcasting includes: a main broadcasting system for transmitting encoded broadcasting signals including a data stream and transmitter identification information (TII) through a main broadcasting network; a repeating system for amplifying and transmitting encoded broadcasting signals of the main broadcasting network, or modulating and amplifying a stream input by the main broadcasting system through a private line, and repeating broadcasting signals of the main broadcasting system through a repeating network; a subscriber station for decoding the encoded signals of the main broadcasting network included in the broadcasting signals received through the main broadcasting network or the repeating network, transmitter identification information (TII), and an encoding key according to a predetermined decoding method; and a decoding key provider for receiving a decoding key from the main broadcasting or repeating system, authenticating a user, and transmitting the decoding key to a charged subscriber station through a mobile communication network.

In another aspect of the present invention, a conditional access subscriber station for a transmitter in a single frequency network for terrestrial and satellite digital broadcasting includes: an OFDM demodulator for selecting a channel when encoded broadcast signals are received through an antenna, and converting the received broadcast signals into OFDM signals; a TII extractor for extracting a TII signal and an encoded key from the OFDM signals; a key table for searching for a key value according to stored TII values; a DAB de-ensembler for dividing the OFDM demodulated broadcasting signals into DAB data and MPEG2 TS data signals; a network identification (NIS) decoder for combining three keys (main broadcasting station TII, repeater station TII, and a decoding key) for decoding the received encoded broadcasting signals according to the TII by using the key table or an ID of a subscriber station, and decoding the MPEG2 TS data signals output by the DAB de-ensembler; and a multimedia processing module for processing the decoded MPEG2 TS data or DAB data to be displayable.

In another aspect of the present invention, a conditional access method for a transmitter by a charged subscriber in a single frequency network for terrestrial and satellite digital broadcasting includes: a) a charged subscriber receiving broadcasting signals including a data stream and transmitter identification information (TII); b) searching a TII key table to find a corresponding key value depending on the cases of a receiver for an exclusive use and a wireless communication combined receiver; c) applying TII of the main broadcasting network or the repeating network and an encoding key value so as to descramble the data stream; d) checking whether the data stream can be descrambled and decoded; e) the charged subscriber receiving a decoding key through a mobile communication network when the data stream cannot be descrambled and decoded; and f) decoding the data stream and receiving broadcasting signals when the data stream can be decoded.

In another aspect of the present invention, a conditional access method for a transmitter by an uncharged subscriber in a single frequency network for terrestrial and satellite digital broadcasting includes: a) an uncharged subscriber receiving broadcasting signals including a data stream and transmitter identification information (TII); b) using the TII as a key value so as to descramble the data stream; c) checking whether the data stream can be descrambled and decoded; d) decoding the data stream and receiving broadcasting signals when the data stream can be decoded; and e) conditionally controlling receiving of the broadcasting signals when the uncharged subscriber's terminal is handed off from the main broadcasting network to the repeating network.

According to the present invention, repeater service providers can activate repeater business and main broadcasting network service providers can extend the broadcasting networks as the repeater service providers provide charged repeater services according to the conditional access method for a transmitter in the single frequency network.

DESCRIPTION OF DRAWINGS

FIG. 4 shows a key table according to an exemplary embodiment of the present invention.

FIG. 5 shows availability of the conditional access service depending on subscriber types and receiving positions according to an exemplary embodiment of the present invention.

BEST MODE

Figure 1:
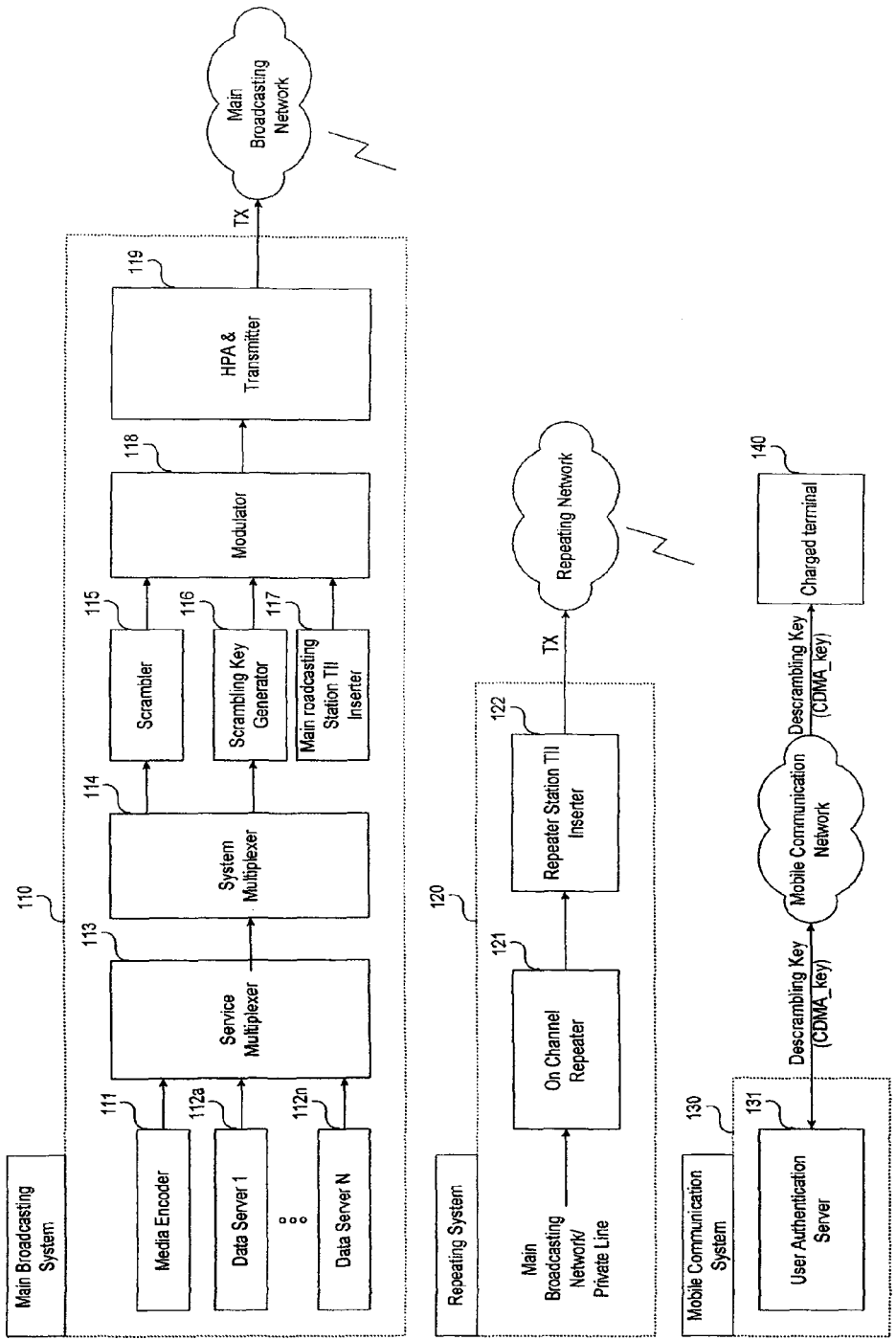
FIG. 1 shows a conditional access system for a transmitter in a single frequency network according to an exemplary embodiment of the present invention.

An exemplary embodiment of the present invention will hereinafter be described in detail with reference to the accompanying drawings.

Hereinafter, referring to the drawings, a conditional access system for a transmitter in a single frequency network according to an exemplary embodiment of the present invention and a method thereof will be described in detail.

The exemplary embodiment of the present invention discloses a digital broadcasting conditional access system (CAS) for providing conditional access to a transmitter by applying a scrambling process to a data stream transmitted to a subscriber and then using a transmitter identifier as a value for finding the data stream key.

In other words, a system and method for controlling a receiver to restrict access to each transmitter according to transmission units when the transmission units are different on a single frequency network in a terrestrial and satellite digital broadcasting system will be disclosed in the embodiment of the present invention.

In detail, charged subscribers and uncharged subscribers can receive a service within a coverage area of the main broadcasting network, and the charged subscribers can receive the service within the coverage area of the repeating network. Also, the uncharged subscribers and charged subscribers can concurrently receive the service within a superimposed coverage area of the main broadcasting network and the repeating network in the broadcasting network with a single frequency network. In this instance, it is needed as prerequisites for the service of the main broadcasting networks for uncharged subscribers to not be influenced by an addition of repeating networks, for the service coverage of the main broadcasting networks to not be reduced, and for service consecution to be acquired when a handoff occurs between the main broadcasting network and the repeating network.

In the embodiment of the present invention, the network identification and the terminals' charged/uncharged subscription states are distinguished. The network identification function (NIF) uses the transmitter identification information (TII) of the terrestrial DMB standard (ETS 300.401 of Eureka-147 Rule) to assign identification (ID) information to the broadcasting network and the repeating network, and manages the networks according to signals distinguished by the ID information. Therefore, fundamental access interception and security are achieved on the data level by scrambling part of transmission data by using a TII-based key.

In this instance, the scrambling process is performed so as to prevent the terminal that has no NIF from being used on all the networks without network identification in advance, and in this instance, the scrambling process is not only applied to the repeating network because the signals work as interference in the signal-superimposed area differing from the signals of the main broadcasting network when the scrambling process is applied to the repeating network.

FIG. 1 shows a conditional access system for a transmitter in a single frequency network according to an exemplary embodiment of the present invention.

Referring to FIG. 1, the conditional access system for a transmitter in a single frequency network according to an exemplary embodiment of the present invention includes a main broadcasting system 110 for transmitting the transmitter identification information (TII), a mobile communication system 130 for authenticating a user and transmitting a key value for allowing a conditional access through a mobile communication network, a repeater system 120 for repeating streams of the main broadcasting station, and a subscriber terminal 140 for processing the repeated streams. Hereinafter, the main broadcasting system 110 will be correspondingly used as a main broadcasting station and the repeater system 120 will be correspondingly used as a repeater station.

First, the conditional access system for a transmitter in a single frequency network adds an encoder and an encoding key generator to the main broadcasting station so that multimedia contents are encoded by using TII and conditional access, and the main broadcasting station 110 adds an encoder 115 to the existing broadcasting system to thus encode multimedia programs or contents, generate an encoding key, and apply TII so that a subscriber station may identify that the encoded broadcasting signals are transmitted through the main broadcasting network.

Also, in the embodiment of the present invention, in the case of the single frequency network (SFN), data for the main broadcasting network and the repeating network are configured to have the same streams and guarantee signal synchronization so that the broadcasting networks are formed without interference between the main broadcasting network and the repeating network.

In this instance, the TII is used as information for identifying the transmitter, and is used for transmitter identification and a decoding key, and the TII substantially controls the subscriber terminal to determine whether the broadcasting signals are transmitted through the main broadcasting network or the repeating network. In this instance, in the case of the above-noted TII, no interference of the SFN occurs when pieces of the TII are different. The TII is not provided in the data area and is established by the combinations of subcarriers of an OFDM sync channel, the combinations are arranged to not be repeated, and hence the IDs of the received transmitters can be distinguished when at least two signals are received in the SFN. Also, the TII assigns an ID according to the position of the transmitter and the broadcasting station.

The main broadcasting station 110 establishes TII of the main broadcasting station and applies the TII so as to protect a corresponding encoding key, and periodically modifies the TII of the main broadcasting station 110 and applies the modified TII when performing corresponding encoding.

Further, the main broadcasting station generates an encoding key for encoding an encoding algorithm and data to which an encoding key generation algorithm is applied and which are then transmitted, and encodes transmission data according to the corresponding encoding key, and the subscriber station 140 finds a decoding key corresponding to the received TII and decodes the data.

Also, the repeater station 120 amplifies frequency network signals corresponding to the SFN and transmits the amplified signals, or modulates streams input by the main broadcasting station 110 through private lines, amplifies the modulated signals, and transmits the amplified signals. When repeating the streams input by the main broadcasting station 110, the repeater station 120 allocates a repeater station TII value to be different from the main broadcasting station TII value, and transmits it.

Further, the mobile communication system 130 transmits the decoding key value to the terminal 140 of a charged subscriber through the mobile communication network.

In addition, the subscriber terminal 140 decodes the encoded signals of the main broadcasting network included in the broadcasting signals received through the main broadcasting network or the repeating network, the TII, and the encoding key according to a predefined decoding scheme. Also, the subscriber station 140 includes a mobile communication module, and each subscriber station transmits a proper encoded key and a decoding key for descrambling through the mobile communication, and the subscriber station having received the decoding key decodes the received data.

In further detail, referring again to FIG. 1, the main broadcasting station 110 includes a media encoder 111, a plurality of data servers 112a to 112n, a service multiplexer 113, a system multiplexer 114, an encoder 115, an encoding key generator 116, a main broadcasting station TII inserter 117, a modulator 118, and an HPA/transmitter 119. In this instance, the TII is a proper identifier assigned to the transmitter, the TII signal is transmitted through a synchronous channel, and the TII can be used together with frequency information (FI) in the SFN.

The service multiplexer 113 multiplexes pieces of additional information related to audio, data, and video data respectively provided by the contents provider's media encoder 111 or the data servers 112a to 112n. The audio service is transmitted through an independent channel so as to provide a CD-quality audio service. The data service can be used to transmit text data such as lyrics of the audio service. Since the video service must include moving pictures, audio, and multiplexing/synchronizing information, the video service is transmitted after it is multiplexed into a stream through a video multiplexer. In this instance, the audio, the data, and the video service are multiplexed into a service channel by a service multiplexer, which is combined with transmission data to be a frame by a system multiplexer, and is then transmitted through a physical channel. In this instance, the conditional access function is not performed by the video multiplexer, scrambling is performed by the encoder, and decoding is performed through a main broadcasting station TII.

The system multiplexer 114 multiplexes the data that is multiplexed by the service multiplexer 113 into broadcast signals in a transmission frame format.

The encoder 115 encodes the broadcast signals transmitted by the system multiplexer 114, and in this instance, the main broadcasting station TII inserter 117 inserts TII into the broadcast signals. That is, the main broadcasting station encodes multimedia programs or contents, transmits a decoding key for decoding the broadcast signals according to a predetermined encoding scheme, and inserts TII for determining whether the network having transmitted the broadcast signals is a main broadcasting station or a repeater station. That is, the main broadcasting station and the repeater station transmit TII for determining by the subscriber station whether the transmitted broadcast signals are main broadcasting station signals or repeater station signals.

The modulator 118 modulates the encoded broadcast signals and the inserted main broadcasting station TII, and the HPA/transmitter 119 transmits the modulated broadcast signals to the subscriber through the main broadcasting network. In this instance, the high power amplifier (HPA) represents a high power amplifier with good linearity from among power amplifiers (PAs), and it receives signals from a frequency upconverter and amplifies the signals so as to generate defined radio frequency outputs to the transmitter's final output terminal.

Further, the repeater station 120 may include an on-channel repeater 121 and a repeater station TII inserter 122, and in this instance, the repeater station 120 amplifies and transmits signals of the main broadcasting network corresponding to the SFN, or modulates, amplifies, and repeats the stream input by the main broadcasting station through the private line. In the case of repeating the stream, the TII value of the repeater station is re-allocated to be different from the value of the main broadcasting station so that it is disallowed for the uncharged subscribers to receive signals within the coverage of the repeating network.

Also, the repeater station 120 receives an ensemble transport interface (ETI) signal of the main broadcasting station 110, transmits the ETI signal to an energy distribution scrambler, a convolutional encoder, and a time interleaver to multiplex the signal into a TDM signal, and transmits the result signal for the purpose of satellite transmission. In this instance, a TII value to be used on the repeating network by using a specific field of the TDM signal is inserted into the repeater station 120.

That is, the repeater station 120 receives the TDM signal from the satellite and demodulates it into an OFDM signal, and in this instance, it extracts the TII value included in the TDM signal and inserts the TII value into the on channel of the OFDM signal. In this instance, since the TII value to be used for the repeating network is different from the TII value used by the main broadcasting network, the TII value of the repeating network is selected and inserted into the TDM field so that the keys to be decoded by the receiver may have the same value.

Also, for example, a repeating network server (not shown) in the repeater station 120 gathers output signals of six service providers to generate TII, outputs the TII through a satellite earth station for the purpose of repeating broadcast programs, generates repeater station TII and a decryption key (CDMA_Key) for the purpose of managing and controlling a repeating network center, manages three keys (main broadcasting station TII, repeater station TII, and a decoding key) in a combined manner, and periodically updates the three keys for the purpose of preventing hacking and controlling subscribers.

Further, the mobile communication system 130 includes a user authentication server 131, and functions to transmit a decoding key for decoding the encoded broadcast signals to a charged subscriber's terminal. Also, the mobile communication system 130 periodically transmits the decoding key through the mobile communication network or the Internet so that the subscriber station may decode the received key and may extract the corresponding encoding key.

Also, the charged subscriber terminal receives the decoding key from an encoding server through the mobile communication system to decode the conditionally accessed broadcast signals, and thereby receives a charged service from the repeating network.

Figure 2:
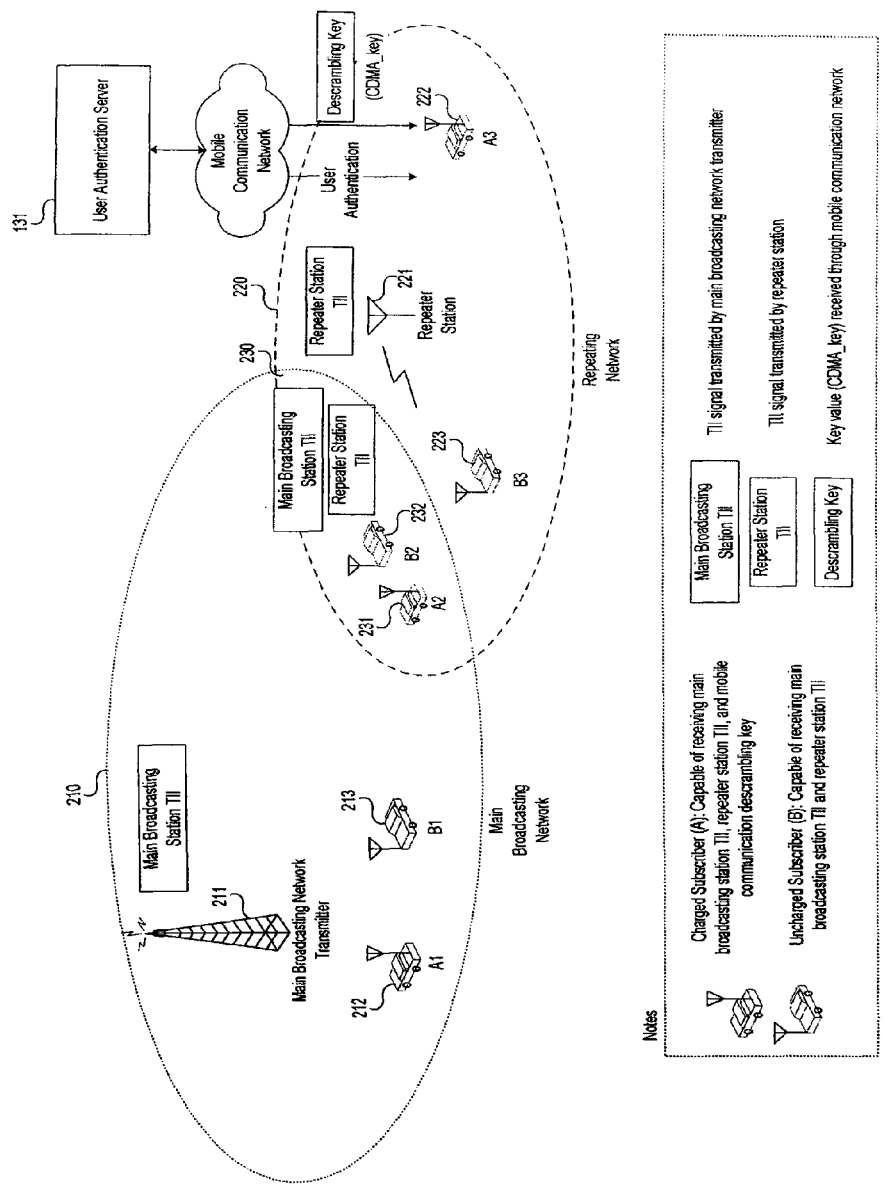
FIG. 2 shows a conceptual conditional access service for a transmitter in a single frequency network according to an exemplary embodiment of the present invention.

FIG. 2 shows a conceptual conditional access service for a transmitter in a single frequency network according to an exemplary embodiment of the present invention.

Referring to FIG. 2, the conditional access service area for a transmitter on the SFN includes a main broadcasting network 210, a repeating network 220, and a superimposed area 230 of the main broadcasting network coverage and the repeating network coverage.

The main broadcasting network 210 has a main broadcasting network transmission station 211, and a charged subscriber 212 (A1) and an uncharged subscriber 213 (B1) receive the main broadcasting station TII transmitted by the main broadcasting network transmission station 211 as a key value.

The repeating network 220 has a repeater station 221, and a charged subscriber 222 (A3) and an uncharged subscriber 223 (B3) receive the repeater station TII transmitted by the repeater station 221 as a key value. In this instance, since a decoding key value is transmitted from the user authentication server 131 to the charged subscriber 222 on the repeating network 220 through the mobile communication network, the charged subscriber 222 on the repeating network 220 can receive a broadcasting service, but the uncharged subscriber 223 can receive no broadcasting service because he has no decoding key.

Also, in the superimposed area 230 of the main broadcasting network coverage and the repeating network coverage, the charged subscriber 231 (A2) and the uncharged subscriber 232 (B2) receive the main broadcasting station TII from the main broadcasting network transmission station 211 or repeater station TII from the repeater station 221.

In other words, the embodiment of the present invention has a configuration allowing conditional access of the broadcasting network according to scrambling and descrambling, and the charged subscribers A1, A2, and A3 can receive the main broadcasting station TII, repeater station TII, and mobile communication decoding key, and the uncharged subscribers B1, B2, and B3 can receive the main broadcasting station TII and repeater station TII, and as a result, as to the combination of received keys, the main broadcasting station TII transmitted by the main broadcasting station or the decoding key received from the mobile communication network is determined to be a key combination to be descrambled.

Figure 3:
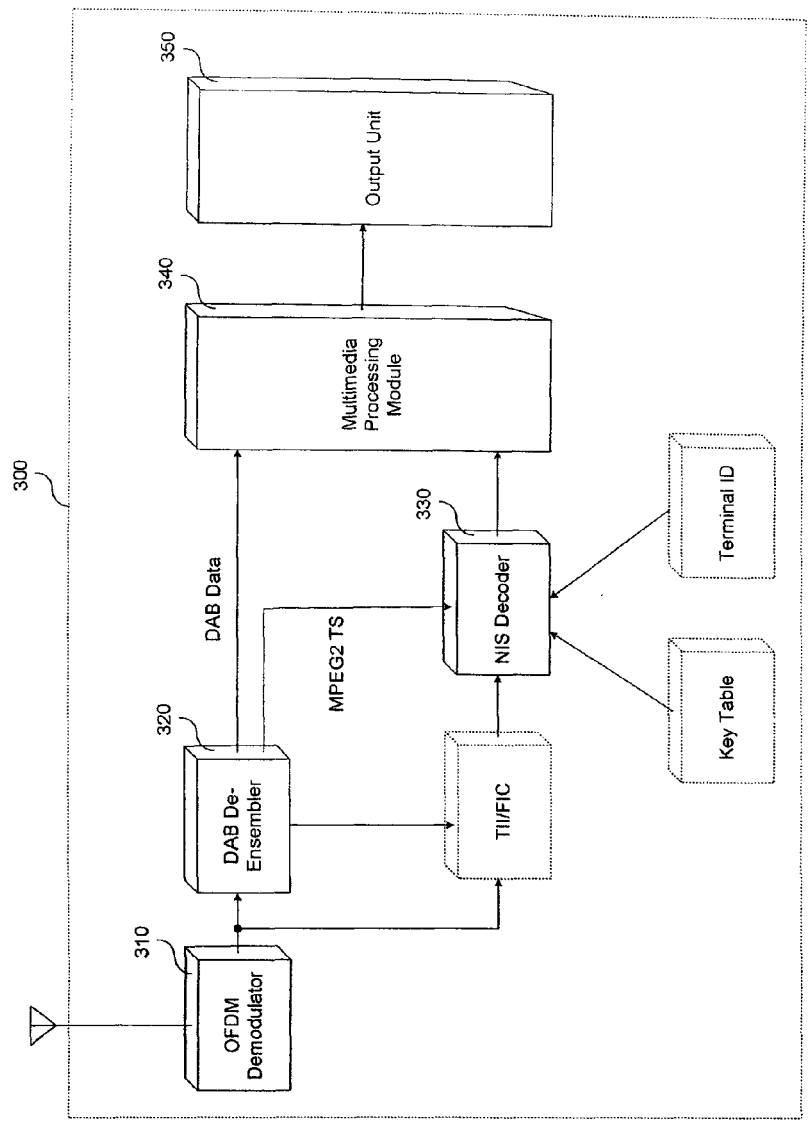
FIG. 3 shows a terminal that is available for a conditional access service for a transmitter in a single frequency network according to an exemplary embodiment of the present invention.

FIG. 3 shows a subscriber station available for a conditional access service for a transmitter in a single frequency network according to an exemplary embodiment of the present invention, wherein the subscriber station can be a subscriber station for exclusive use or a mobile communication terminal. In this instance, when the subscriber station is a terminal for exclusive use without a communication module, the subscriber station is required to access the Internet so as to receive a service for updating the TII through USB communication.

Further, when the subscriber station is a radio communication combined terminal having a communication module, a mobile communication service provider transmits TII through a radio communication network in a wireless manner, and in this instance, it is possible to encode the TII by using a proper number of the corresponding terminal, control the TII to be decoded by the corresponding terminal, and thereby prevent hacking.

For example, the subscriber station 300 as a DMB receiver includes an antenna, an OFDM demodulator 310, a DAB de-ensembler 320, an NIS decoder 330, a multimedia processing module 340, and an output unit 350, and it also has a decoding algorithm for decoding encoded broadcast signals, and has a matching table in a program format for matching TII for finding a decoding key value and the key value.

The subscriber station 300 receives broadcasting signals encoded by the OFDM demodulator 310, the TII/FIC extracts a TII signal and an encoded key, and the key table stores respective TII key tables to find key values according to the TII values. In this instance, the terminal identifier can decrypt the key table by using the proper number of the corresponding terminal since the key table is encoded.

Also, the NIS decoder 330 combines the above-noted three keys (main broadcasting station TII, repeater station TII, and a decoding key) to decode MPEG2 TS data signals output by the DAB de-ensembler 320, and the data are then displayed by the output unit 350 through the multimedia processing module 340.

In detail, in the subscriber station 300, when receiving encoded broadcast signals through an antenna, the OFDM demodulator 310 selects a corresponding channel and converts the received broadcast signals into OFDM signals, and when the received signals are encoded broadcast signals, the NIS decoder 340 uses TII/FIC included in the broadcast signals output by the OFDM demodulator 310 to decode the encoded broadcast signals that are generated by encoding the MPEG2 TS data output by the DAB de-ensambler 320 according to a decoding algorithm.

That is, the NIS decoder 340 uses a key table or a subscriber station proper identifier to descramble the received encoded broadcast signals according to a value that matches the TII.

Also, the multimedia processing module 340 receives data output by the NIS decoder 330 and DAB data output by the DAB de-ensambler 320, and processes the data that are displayable by the output unit 370.

Further, the subscriber station 300 can additionally include a USB port (not shown), and the USB port can be used when the subscriber station 300 accesses the Internet to receive a decoding key through a mobile communication network.

The subscriber station according to an embodiment of the present invention has a decoding algorithm for decoding encoded broadcast signals, and has a matching table in a program format for matching TII for finding a decoding key value and the key value.

Also, when the subscriber station is a terminal for exclusive use, the subscriber station receives a key table through a PC and an entitlement management message (EMM), matches a value of repeating network TII with a value of the key table to find a descrambling key value and perform descrambling, and when the subscriber station is a wireless communication combined terminal, the subscriber station receives a key table through a wireless communication network, receives a decoding key through a wireless communication network, and matches the decoding key with a value of the key table to find a descrambling key value.

Further, the subscriber station has a key table for a charged service, and it uses TII or a decoding key to find a matched value from the corresponding key table and descramble the matched value.

The subscriber station has a TII key table for a main broadcasting network, a TII key table for a repeating network, and a TII key table for a charged mobile communication subscriber for the purpose of descrambling and decoding, and in detail, it has a TII key table for a main broadcasting network when the subscriber station is a terminal for an uncharged service, it has a TII key table for a main broadcasting network and a TII key table for a repeating network for a charged service when the subscriber station is a terminal for a charged service without a communication module, it has a TII key table for a main broadcasting network when the subscriber station is an unsubscribed and uncharged combined terminal having a wireless communication module, and it has a TII key table for a main broadcasting network and an additional TII key table for a charged communication subscriber when the subscriber station has a wireless communication module and is a charging combined terminal subscribed to a charged service.

Also, the subscriber station receives a TII key table for a repeating network through a PC or an EMM for the purpose of a charged subscription when the subscriber station is a terminal for an exclusive use without a communication module, and the subscriber station receives a TII key table for a charged communication subscriber through a corresponding wireless communication network when the subscriber station is a wireless communication combined terminal and is subscribed for a charged service.

Also, the subscriber station receives a corresponding key table in the case of initial subscription, and updates the key table with a new key table value periodically or for the purpose of preventing hacking or managing termination of subscribers.

Further, in the case of managing subscribers, the subscriber station receives a TII key table for a repeating network for each predetermined period, such as a month when the subscriber station is a terminal for exclusive use, and the subscriber station is not allowed to receive the TII key table for a repeating network and it thus no longer consecutively decodes the scrambled signals received through the repeating network.

In addition, the subscriber station consecutively receives the TII key table when a wireless communication subscriber subscribes a TII key table for a modified charged communication subscriber, and the subscriber station can no longer receive the TII key table for a modified charged communication subscriber when the subscriber station does not subscribe to the wireless communication.

Also, the TII value for the main broadcasting network and the TII value for the repeating network are modified periodically so as to prevent hacking the TII by the subscriber station.

FIG. 4 shows a key table according to an embodiment of the present invention.

Referring to FIG. 4, TII-a1 is a TII key table for a main broadcasting network, TII-b1 is a TII key table for a repeating network, and TII-t1 is a communication TII key table transmitted through a wireless communication network, and at least one TII key table for a main broadcasting network, one TII key table for a repeating network, and one communication TII key table are provided. The key table stores different values depending on a charged/uncharged state, and exclusively used/combined receivers, and the receivers perform a corresponding scrambling and decoding process. In particular, the wireless communication combined terminal uses a wireless network, and the terminal for exclusive use stores a TII key table for a repeater.

Also, according to the matching result of the key table caused by the TII value (TII-a1) for a main broadcasting network and the TII value (TII-b1) for a repeating network, corresponding keyword values can be KTBL(TII-a1) and KTBL(TII-b1) respectively, and in this instance, the scrambled data of the main broadcasting network and the repeating network must be solved with the same keyword since the data are signals with the same pattern, and it is controlled to generate the same values by applying a predetermined function (G).

In detail, it is given that TII-b1=G(TII-a1), and in this instance, G represents a function for converting TII-a1 into TII-b1, and it is given that the key table value of KTBL(TII-a1) is equal to KTBL(TII-b1).

Also, a CW (control word) for generating a scrambling operation at the main broadcasting network's transmission part can be generated by using KTBL (TII-a1) that is a key table value of TII-a1. That is, since the receiver can know TII-a1, KTBL (TII-a1) can be known in the key table, and the CW can be found by solving the encoding function. In this instance, the scrambling operation is also applied to the repeating network, and KTBL (TII-b1) that is a key table value by TII-b1 has the same value as that of the main broadcasting network, and hence, the same CW can be found.

FIG. 5 shows availability of the conditional access service depending on subscriber types and receiving positions according to an exemplary embodiment of the present invention.

FIG. 5 shows a table for combinations that are received depending on the position of the subscriber receiver and the subscription type shown in FIG. 2, and the charged subscriber can receive signals from the main broadcasting network and the repeating network, and the uncharged subscriber can receive the signals from the main broadcasting network, thereby allowing the conditional access depending on the transmitters.

Figure 6:
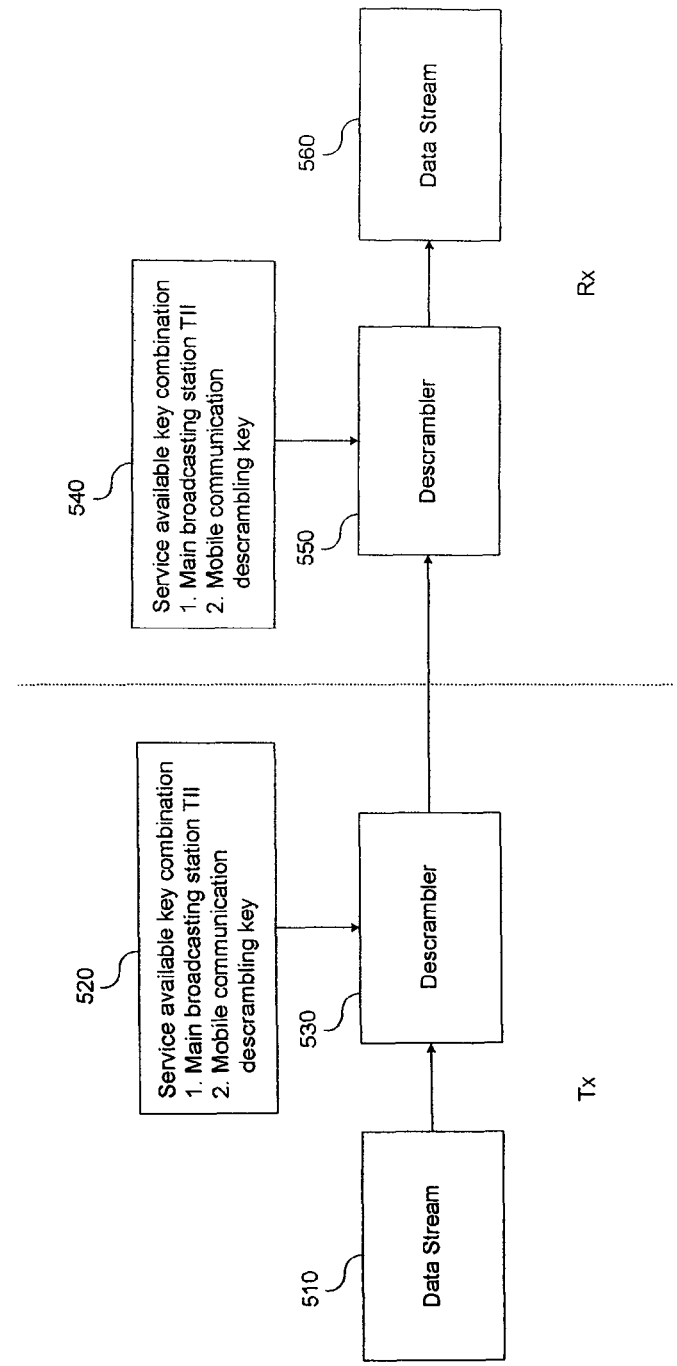
FIG. 6 shows a block diagram for encryption transmission and receiving in a conditional access system in a single frequency network according to an exemplary embodiment of the present invention.

FIG. 6 shows a block diagram for encoding transmission and receiving in a conditional access system in a single frequency network wherein the encoding is given with respect to transmission and receiving according to an embodiment of the present invention.

Referring to FIG. 6, a data stream 510 on the transmission part is encoded by scrambling by the scrambler 530, and in this instance, the main broadcasting station's TII value or a mobile communication decoding key 520 is used for the encoding. In this instance, the scrambling process represents a process for scrambling transmittable multimedia data according to a predetermined rule, and thus changes signals so that no user without entitlement can view programs.

Also, as to the key for solving the encoding by the receiving part, the descrambler 550 solves the encoding according to the TII value of the main broadcasting station or the mobile communication decoding key 540 to decode the encryption into the original data stream 560.

In this instance, an uncharged subscriber can receive TII of the main broadcasting station, and a charged subscriber can receive both TII of the main broadcasting station and a mobile communication decoding key.

Therefore, the uncharged subscriber can receive TII from the main broadcasting station, and he cannot receive signals from the repeating network since the repeating network transmits a repeater station TII value that is different from a main broadcasting station TII value, and the charged subscriber can receive signals through the main broadcasting network and can receive signals by using a decoding key received from the mobile communication through the repeating network.

A problem at the transmission part is that the uncharged subscriber can receive signals through the repeating network when he stores the TII value that is received within the main broadcasting network and then moves to the repeating network. In order to solve the problem, an encoding server in the main broadcasting station periodically modifies a main broadcasting station TII value, and the problem of scrambling the data stream is solved by applying the modified TII value.

Figure 7:
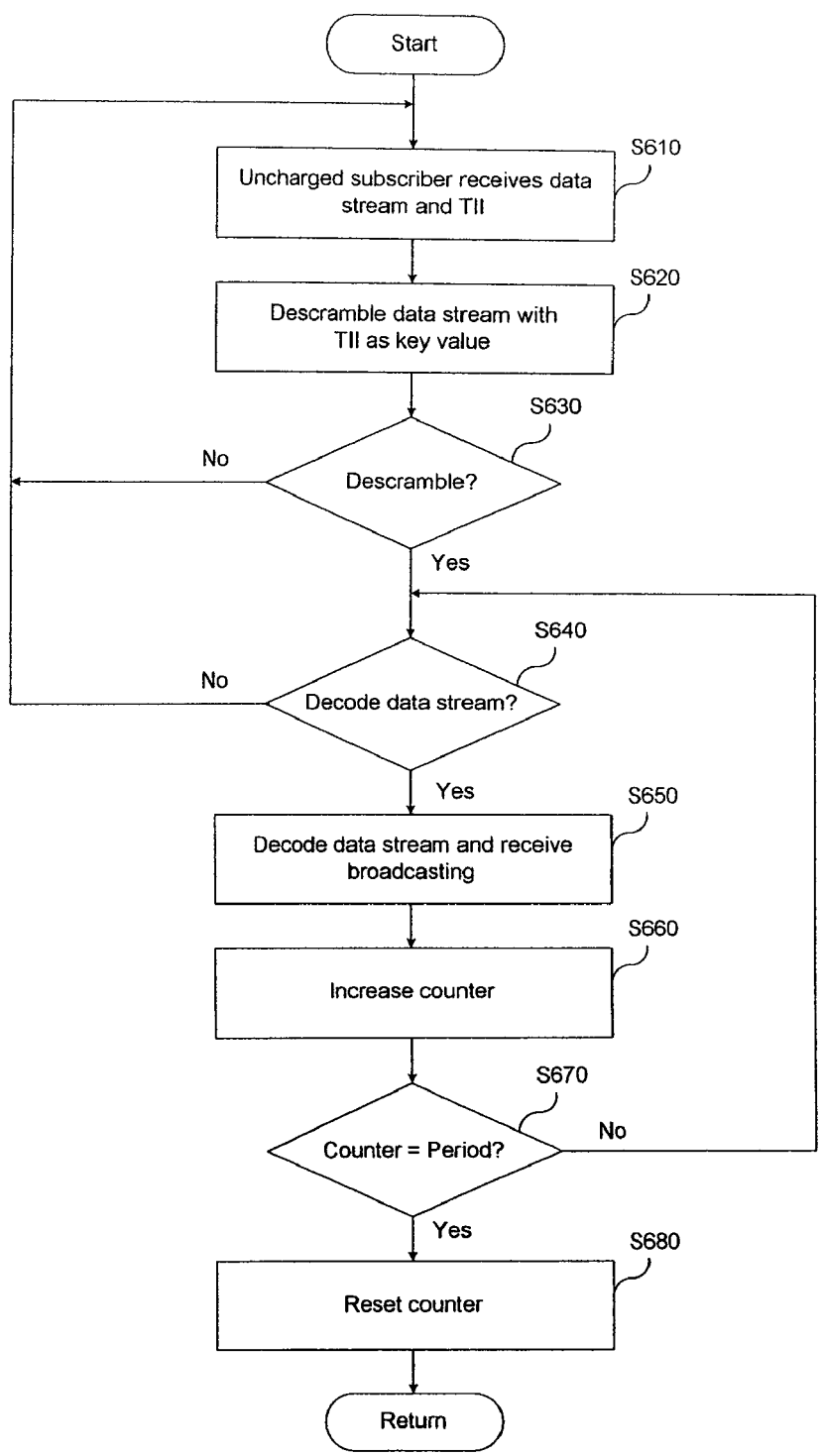
FIG. 7 shows a flowchart for an uncharged subscriber's conditional access method for a transmitter in a single frequency network according to an exemplary embodiment of the present invention.

FIG. 7 shows an operational flowchart of a method for an uncharged subscriber's conditional access method for a transmitter in a single frequency network according to an embodiment of the present invention.

Referring to FIG. 7, in the method for an uncharged subscriber's conditional access method for a transmitter in a single frequency network according to an embodiment of the present invention, an uncharged subscriber receives a data stream and TII in step S610, searches the received TII values, and descrambles the received data stream by using the searched value as a key value in step S620.

It is checked whether the data stream can be descrambled by a terminal of the uncharged subscriber in step S630, and when the data stream can be descrambled, it is checked whether the data stream can be decoded in step S640. When the data stream can be decoded, the data stream is decoded to receive broadcast signals in step S650.

However, as described above, when the uncharged subscriber stores the TII value received within the main broadcasting network and then moves to the repeating network, the uncharged subscriber can receive signals in the repeating network. In order to solve the problem, an encoding server in the main broadcasting station periodically modifies the main broadcasting station TII value, and the problem of scrambling the data stream is solved by applying the modified TII value.

In detail, in the case of receiving broadcast signals by decoding the data stream, a counter of the receiving terminal is increased in step S660, it is checked whether the value of the counter corresponds to a predetermined period value in step S670, and when they do not correspond to each other, the above-noted steps S640 to S660 are repeated until the counter corresponds to the period value. When the counter corresponds to the period value, the counter is reset in step S680. In this instance, the period value is generated by modifying the main broadcasting station TII value by the encoding server of the main broadcasting station, and when the value of the counter in the uncharged subscriber' receiving terminal corresponds to the period value, the counter is reset, and hence, the uncharged subscriber's receiving of signals in the repeating network is prevented when the uncharged subscriber stores the TII value given within the main broadcasting network and moves to the repeating network.

The uncharged subscriber's receiving terminal may fail to normally receive broadcast signals since the receiving terminal cannot descramble signals in the previous step of S630 or cannot decode the data stream in the previous step S640.

In other words, the uncharged subscriber's receiving terminal normally receives signals in the main broadcasting network, but it receives no signals in the repeating network. That is, the uncharged subscriber's receiving terminal periodically searches for the TII value, and when the receiving terminal moves to the repeating network from the main broadcasting network to generate a handoff, a TII value received from the repeating network is applied as the above-noted TII value, and in this instance, since the data stream is not descrambled, the receiving terminal cannot receive normal broadcast signals from the repeating network.

As a result, the method for an uncharged subscriber's conditional access method for a transmitter in a single frequency network cannot analyze the descrambled stream or decode the same, and cannot normally receive broadcast signals because of a lack of a decoding key.

Figure 8:
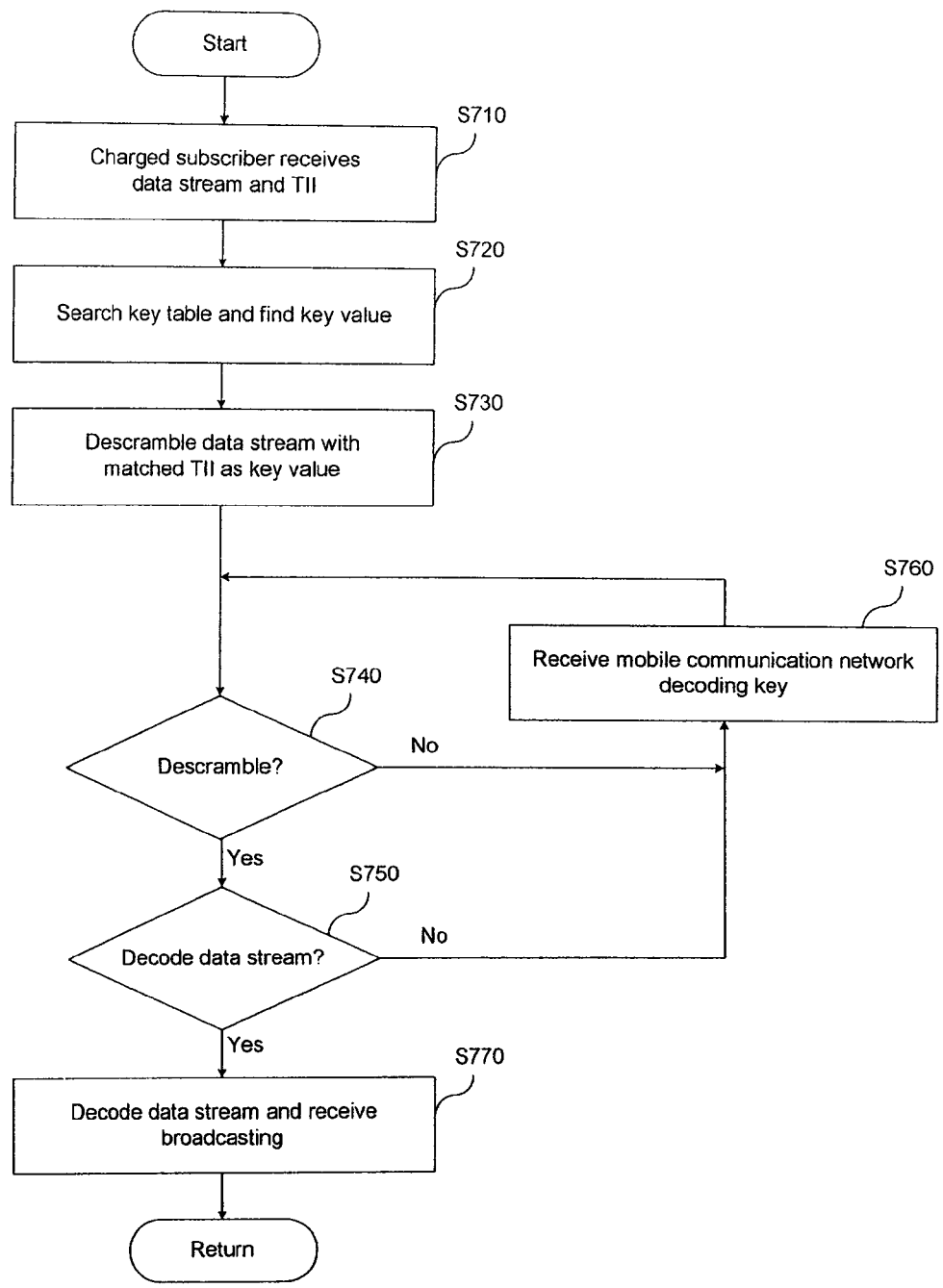
FIG. 8 shows an operational flowchart for a charged subscriber's conditional access method for a transmitter in a single frequency network according to an exemplary embodiment of the present invention.

FIG. 8 shows an operational flowchart for a charged subscriber's conditional access method for a transmitter in a single frequency network according to an embodiment of the present invention.

Referring to FIG. 8, in the charged subscriber's conditional access method for a transmitter in a single frequency network, a charged subscriber receives TII together with a data stream within the main broadcasting network or the repeating network in step S710, and searches a TII key table according to a receiver for an exclusive use and a wireless communication combined receiver to find a corresponding key value in step S720. The received TII value is searched, and the received stream is descrambled based on the TII value as a key value in step S730.

Next, it is checked whether the data stream can be descrambled by the charged subscriber's terminal in step S740, it is checked whether the data stream can be decoded in step S750 when the data stream can be descrambled, and the scrambling process is performed to normally receive broadcast signals in step S770 when the data stream can be decoded.

When the data stream cannot be descrambled in the previous step of S740, or the data stream descrambled in S740 cannot be decoded, a decoding key is received from the mobile communication network in step S760. That is, when the received stream is not descrambled or decoded by using the TII value received by the charged subscriber's terminal, for example, when the charged subscriber's receiving terminal moves to the repeating network from the main broadcasting network to generate a handoff, the charged subscriber receives the decoding key through the mobile communication network and performs scrambling based on the value thereby allowing receiving of signals in the repeating network.

In this instance, the charged subscriber's receiving terminal periodically searches for the TII value, receives a decoding key from the mobile communication network, and normally receives broadcast signals in the repeating network when the receiving terminal moves to the repeating network from the main broadcasting network to generate a handoff and it cannot normally receive broadcast signals.

As a result, the charged subscriber's conditional access method for a transmitter in a single frequency network according to an embodiment of the present invention allows receipt of a decoding key from a mobile communication network and receipt of normal broadcast signals when data streams cannot be descrambled or decoded in the repeating network.

In other words, when the uncharged subscriber's terminal is in the repeating network, the terminal cannot normally receive broadcast signals, the subscriber can normally receive the broadcast signals when he switches himself to a charged subscriber and then receives a decoding key from the mobile communication network, and the switching to the charged service activates the repeater business of repeater service providers.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention, repeater service providers can activate repeater business and main broadcasting network service providers can extend the broadcasting networks as the repeater service providers provide charged repeater services according to the conditional access method for a transmitter in the single frequency network.

The invention claimed is:

1. A conditional access system for a transmitter in a single frequency network for terrestrial and satellite digital broadcasting, the conditional access system comprising:
   a main broadcasting system configured to transmit encoded signals including a data stream and a main broadcasting system transmitter identification information (TII) value through a main broadcasting network;
   a repeating system configured to:
      amplify and transmit the encoded signals of the main broadcasting network, or modulate and amplify a stream input by the main broadcasting system through a private line,
      allocate a repeating system TII value to be different from the main broadcasting system TII value, and
      repeat the broadcasting signals, including the encoded signals of the main broadcasting network, through a repeating network, wherein the repeating system extracts the main broadcasting system TII value and inserts the repeating system TII value in the broadcasting signals when repeating the broadcasting signals;
   a subscriber station configured to decode the encoded signals of the main broadcasting network included in the broadcasting signals received through the main broadcasting network or the repeating network, transmitter identification information (TII), and an encoding key; and
   a decoding key provider configured to authenticate a user and transmit a decoding key to a charged subscriber station through a mobile communication network, wherein:
      the charged subscriber station is in the repeating network coverage, and
      the charged subscriber station is configured to store the decoding key transmitted from the decoding key provider and decode the broadcasting signals using the decoding key corresponding to the repeating system TII value.

2. The conditional access system of claim 1, wherein the main broadcasting system encodes a multimedia program or contents, and transmits a decoding key for decoding the broadcasting signals according to a predetermined encoding method.

3. The conditional access system of claim 1, wherein the main broadcasting system and the repeating system respectively transmit transmitter identification information (TII) for identifying by the subscriber station whether the transmitted broadcasting signal is a main broadcasting network signal or a repeating network signal.

4. The conditional access system of claim 1, wherein the main broadcasting system is configured to periodically modify the main broadcasting system TII value, and apply a modified TII value to an encoding process.

5. The conditional access system of claim 1, wherein the main broadcasting system sets the main broadcasting system TII value and applies the main broadcasting system TII value so as to protect a corresponding encoding key.

6. The conditional access system of claim 1, wherein the main broadcasting system enables conditional access for respective transmitters by using transmitter identification information (TII) as a key value of a transmission stream, the TII being used for receiving different values from the respective transmitters in the single frequency network.

7. The conditional access system of claim 1, wherein the main broadcasting system generates the encoding key for encoding transmission data by applying an encoding algorithm and a key generation algorithm and encodes the transmission data according to the corresponding encoding key, and the subscriber station finds a key value from a key table according to received TII and decodes the key value.

8. The conditional access system of claim 1, wherein the subscriber station receives TII of the main broadcasting system from the main broadcasting system and receives TII of the repeating system from the repeating system so as to decode the encoded broadcasting signals, and when the subscriber station is the charged subscriber station, the charged subscriber station receives the decoding key through a corresponding mobile communication network to decode the encoded broadcasting signals.

9. The conditional access system of claim 8, wherein when the subscriber station is an uncharged subscriber station, a data stream is descrambled and decoded by using transmitter identification information (TII) and an encoding key in the main broadcasting network, and receiving of the broadcasting signals are controlled in the repeating network.

10. The conditional access system of claim 1, wherein the subscriber station installs a mobile communication module, transmits a proper encoded key and a decoding key for descrambling to each subscriber station through the mobile communication, and a predetermined subscriber station having received the decoding key searches the key table stored in the subscriber station to find a corresponding key value and decodes the received data.

11. The conditional access system of claim 1, wherein the subscriber station installs a programmed function and a table for identifying the received TII value, decoding the received key to extract a corresponding encoding key, and descrambling the received data by using the extracted encoding key.

12. The conditional access system of claim 1, wherein the subscriber station is controlled to generate the same value by applying a predetermined function of G since the scrambled data of the main broadcasting network and the repeating network must be solved with the same keyword as they have the same pattern according to the matching result of the key table for the TII of the main broadcasting network and the TII of the repeating network.

13. The conditional access system of claim 1, wherein when the subscriber station is a terminal for an exclusive use, a key table is received through a PC and an entitlement management message (EMM) to match a value of repeating network TII with a value of the key table, find a descrambling key value, and perform a descramble process, and when the subscriber station is a wireless communication combined terminal, a key table is received through a wireless communication network and a decoding key is received through the wireless communication network to match the decoding key with a value of the key table and find a key value for a scrambling process.

14. The conditional access system of claim 1, wherein the subscriber station has a key table for a charged service in advance, and uses TII or a decoding key to find a matched value from the corresponding key table and descramble the value.

15. The conditional access system of claim 1, wherein the subscriber station has a TII key table for a main broadcasting network, a TII key table for a repeating network, and a TII key table for a charged mobile communication subscriber.

16. The conditional access system of claim 15, wherein when the subscriber station is a terminal for exclusive use of an uncharged service, a TII key table for a main broadcasting network is installed; when the subscriber station is a terminal for exclusive use of a charged service without a communication module, a TII key table for a main broadcasting network and a TII key table for a repeating network for a charged service are additionally installed; when the subscriber station has a wireless communication module and it is a unsubscribed terminal combined with an uncharged service, a TII key table for a main broadcasting network is installed; and a charged service combined terminal having a wireless communication module and having registered to a charged service has a TII key table for a main broadcasting network and a TII key table for a charged communication subscriber.

17. The conditional access system of claim 1, wherein when the subscriber station is a terminal for exclusive use without a communication module, a TII key table for a repeating network is received through a PC or an EMM so as to subscribe to a charged service, and when the subscriber station is a wireless communication combined terminal and is subscribed to a charged service, a TII key table for a charged communication subscriber is received through the corresponding wireless communication network.

18. The conditional access system of claim 1, wherein the subscriber station receives a corresponding key table at the initial subscription stage, and the key table is periodically updated with a new key table value so as to prevent hacking and manage subscribers' cancellation.

19. The conditional access system of claim 1, wherein when the subscriber station is a terminal for exclusive use, the subscriber station receives a TII key table for a repeating network that is periodically modified so as to manage subscribers, and when the subscriber terminates subscription after registration, the subscriber station does not receive a TII key table for a repeating network to consecutively prevent the data received through the repeating network from being decoded.

20. The conditional access system of claim 1, wherein in the case of a wireless communication subscriber, when the subscriber is subscribed to a TII key table for a modified charged communication subscriber, the subscriber station consecutively and automatically receives signals, and when the subscriber is not subscribed to the wireless communication, the subscriber is controlled to no longer receive the TII key table for a charged communication subscriber.

21. The conditional access system of claim 1, wherein the subscriber station is encoded by using the terminal's proper number, and controls the transmitter identification information (TII) to be decoded by the corresponding terminal, thereby preventing hacking.

22. The conditional access system of claim 1, wherein the subscriber station periodically modifies the main broadcasting network TII value and the repeating network TII value so as to prevent TII hacking.

23. The conditional access system of claim 1, wherein the decoding key provider periodically transmits a key through a mobile communication network or the Internet so that the subscriber station may decode the received key and extract the corresponding encoding key.

24. A conditional access subscriber station for a transmitter in a single frequency network for terrestrial and satellite digital broadcasting, the conditional access subscriber station comprising:
- an OFDM demodulator configured to select a channel when encoded broadcast signals are received through an antenna, and convert the encoded broadcast signals into OFDM signals;
- a transmitter identification information (TII) extractor configured to extract a TII signal and an encoded key from the OFDM signals;
- a key table configured to search for a key value according to stored TII values;
- a DAB de-ensembler configured to divide the OFDM signals into DAB data and MPEG2 TS data signals;
- a network identification (NIS) decoder configured to combine three keys, namely a main broadcasting station TII key, repeater station TII key, and a decoding key, for decoding the encoded broadcasting signals according to the TII values by using the key table or an ID of a subscriber station, and decode the MPEG2 TS data signals output by the DAB de-ensembler; and
- a multimedia processing module for processing the decoded MPEG2 TS data or DAB data to be displayable,
- wherein the subscriber station of a charged subscriber identifies whether the encoded broadcast signals are from a main broadcasting network or a repeating network by using the TII values, decodes the encoded broadcast signals by using a main broadcasting station TII value when the encoded broadcast signals are from the main broadcasting network, and decodes the broadcast signals by using the decoding key received through a mobile communication network when the encoded broadcast signals are from the repeating network.

25. The conditional access subscriber station of claim 24, wherein the subscriber station decodes the key table by using a terminal ID which is a proper number of the corresponding terminal since the key table is encoded.

26. A conditional access method for a transmitter by a charged subscriber in a single frequency network for terrestrial and satellite digital broadcasting, the conditional access method comprising:
- a) a charged subscriber receiving broadcasting signals including a data stream and transmitter identification information (TII);
- b) searching a TII key table to find a corresponding key value depending on the cases of a receiver for exclusive use and a wireless communication combined receiver;
- c) applying:
  - main broadcasting network TII or repeating network TII, and
  - an encoding key value so as to descramble the data stream;
- d) checking whether the data stream can be descrambled and decoded;
- e) the charged subscriber receiving a decoding key through a mobile communication network when the data stream cannot be descrambled and decoded; and
- f) decoding the data stream and receiving broadcasting signals when the data stream can be decoded,
- wherein the charged subscriber decodes the data stream using the decoding key corresponding to repeating network TII;
- wherein f) further comprises scrambling and decoding, with the charged subscriber, the data stream by using the TII and the encoding key in the main broadcasting network, and identifying, with the charged subscriber, the main broadcasting network and the repeating network by using the TII to identify the network received by the current terminal by using the TII in the repeating network and descrambling and decoding the data stream by using the decoding key received through the mobile communication network.

27. The conditional access method of claim 26, wherein receiving the broadcasting signals in a) includes receiving encoded signals in the main broadcasting system, and descrambling and decoding the encoded signals by the main broadcasting system TII or the decoding key.

28. A conditional access method for a transmitter by an uncharged subscriber in a single frequency network for terrestrial and satellite digital broadcasting, the conditional access method comprising:
- a) an uncharged subscriber receiving broadcasting signals including a data stream and transmitter identification information (TII);
- b) using the TII as a key value so as to descramble the data stream;
- c) checking whether the data stream can be descrambled and decoded;
- d) decoding the data stream and receiving the broadcasting signals when the data stream can be decoded; and
- e) conditionally controlling receiving of the broadcasting signals when the uncharged subscriber's terminal is handed off from the main broadcasting network to the repeating network,
- wherein e) further comprises periodically modifying, with an encoding server in the main broadcasting system, the TII of the main broadcasting system which is used by the uncharged subscriber to identify whether the broadcasting signals are from the main broadcasting network and decoding the broadcasting signals, and applying the TII as modified to scrambling of the data stream, and hence the uncharged subscriber is controlled to conditionally receive the broadcasting signals.

29. The conditional access method of claim 28, wherein receiving the broadcasting signals in a) comprises receiving encoded broadcasting signals in the main broadcasting system to be descrambled and decoded through the TII of the main broadcasting system or the decoding key.

30. The conditional access method of claim 28, wherein conditionally controlling receiving in e) comprises descrambling and decoding, with the uncharged subscriber, the data stream by using the TII and the encoding key in the main broadcasting network, and receiving of the broadcasting signals is conditionally controlled in the repeating network.

31. The conditional access method of claim 28, wherein the step e) comprises:
- e-1) increasing a value of a counter installed in the uncharged subscriber station;
- e-2) checking whether the value of the counter corresponds to a period value established by the main broadcasting system; and
- e-3) resetting the counter when the counter corresponds to the period value established by the main broadcasting system.

32. The conditional access method of claim 31, wherein resetting the counter in e-3) comprises resetting the value of the counter of the uncharged subscriber station, the uncharged subscriber's terminal does not use the main broadcasting system TII in the repeating network, and the broadcasting signals are conditionally received.

33. A conditional access system for a transmitter in a single frequency network for terrestrial and satellite digital broadcasting, the conditional access system comprising:
- a main broadcasting system configured to encode broadcasting signals including a data stream and transmitter identification information (TII) through a main broadcasting network;
- a repeating system configured to:
    - amplify and transmit encoded broadcasting signals of the main broadcasting network, or modulate and amplify a stream input by the main broadcasting system through a private line,
    - allocate a repeating system TII value to be different from the main broadcasting system TII value, and
    - repeat broadcasting signals of the main broadcasting system through a repeating network; and
- a decoding key provider configured to authenticate a user and transmit the decoding key to a charged subscriber station through a mobile communication network,
- wherein the decoding key corresponds to the repeating system TII value,
- wherein the repeating system extracts the main broadcasting system TII included in the broadcasting signals of the main broadcasting system and inserts the repeating system TII value, which is different from the main broadcasting system TII value when repeating the broadcasting signals of the main broadcasting system.

* * * * *